United States Patent [19]

Conforti

[11] 4,452,867
[45] Jun. 5, 1984

[54] STORAGE BATTERY CONTAINING VOLTAGE REDUCING MEANS

[75] Inventor: Frederick J. Conforti, Aurora, Ill.

[73] Assignee: Pittway Corporation, Aurora, Ill.

[21] Appl. No.: 470,315

[22] Filed: Feb. 28, 1983

[51] Int. Cl.³ ............................................ H01M 2/00
[52] U.S. Cl. ........................................ 429/7; 429/61; 429/122
[58] Field of Search ...................... 429/7, 50, 92, 61, 1, 429/204, 206, 122, 61

[56] References Cited

U.S. PATENT DOCUMENTS

| | | | |
|---|---|---|---|
| 2,672,498 | 3/1954 | Temple | 429/7 |
| 3,811,944 | 5/1974 | Liang et al. | 429/7 |
| 3,885,991 | 5/1975 | Finkel | 429/1 |
| 3,941,135 | 3/1976 | Sturm et al. | 429/7 X |
| 4,306,001 | 12/1981 | Brown | 429/61 |
| 4,431,713 | 2/1984 | Fehling et al. | 429/7 |

FOREIGN PATENT DOCUMENTS

| | | | |
|---|---|---|---|
| 482550 | 3/1938 | United Kingdom | 429/7 |
| 973304 | 10/1964 | United Kingdom | 429/7 |
| 815797 | 3/1981 | U.S.S.R. | 429/1 |

Primary Examiner—Anthony Skapars
Attorney, Agent, or Firm—Emrich & Dithmar

[57] ABSTRACT

A storage battery comprises interleaved anode and cathode electrodes and an electrolyte between them. A pair of oppositely poled diodes is coupled in parallel between one of the electrodes and one of the terminals of the battery, the other electrode being coupled to the other battery terminal.

7 Claims, 1 Drawing Figure

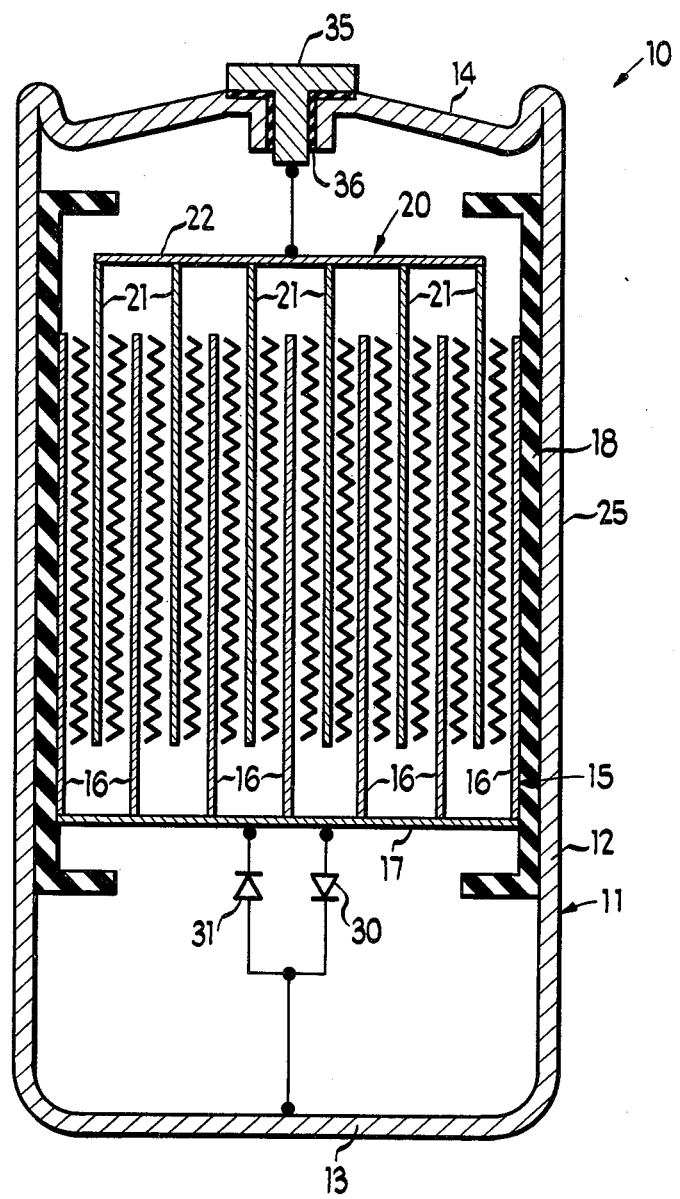

STORAGE BATTERY CONTAINING VOLTAGE REDUCING MEANS

BACKGROUND OF THE INVENTION

Storage batteries or secondary batteries have two general classifications, lead-acid and nickel-alkaline. Their basic feature is that they are rechargeable. The electrochemical action is reversible so that the battery may be charged by passing a current through the battery in the opposite direction to that of discharge.

In the lead-acid type storage battery, the electrolyte is an acid and the plates are largely lead. Normally the electrolyte is a diluted sulfuric acid.

In the alkaline type storage battery, electrical energy is converted from chemical action through an alkaline solution. One type of battery has positive plates with an active material of nickel and negative plates of iron. Another type uses nickel and cadmium plates. A third type uses plates respectively of silver oxide and zinc. In all three types, the electrolyte is potassium hydroxide.

The voltage produced by a storage battery is dependent on its chemistry. In other words, which ever type battery is selected, its voltage output is fixed by the chemicals therein. For example, a lead-acid storage battery produces an output of two volts.

A particular item with which the battery is used on the other hand, may require a battery having a lower voltage. For example, many consumer products use "D" batteries. These are of the primary or non-rechargeable type and produce a voltage output of 1.5 volts. A rechargeable lead-acid battery would not be usable, as such, because its output is two volts.

SUMMARY OF THE INVENTION

It is therefore an important object of the present invention to provide a storage battery which contains structure that reduces the inherent voltage produced by the chemicals in such battery.

Another object is to provide a storage battery having a voltage output comparable to similarly sized primary batteries.

Another object is to utilize semiconductor structure within a battery to reduce the voltage output and to provide a path for charging the battery.

In summary there is provided a storage battery comprising a pair of terminals, an anode electrode, a cathode electrode, an electrolyte between and in contact with the electrodes, a pair of oppositely poled semiconductor devices coupled in parallel between one of the electrodes and one of the terminals, the other of the electrodes being coupled to the other of the terminals.

The invention consists of certain novel features and a combination of parts hereinafter fully described, illustrated in the accompanying drawing, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawing a preferred embodiment thereof, from an inspection of which, when considered in connection with the following description, the invention, its construction and operation, and many of its advantages should be readily understood and appreciated. The single FIGURE depicts a storage battery in longitudinal cross section, incorporating the features of the present invention.

DESCRIPTION OF THE PREFERRED EMBODIMENT

Referring to the drawing, there is depicted a battery 10 comprising a conductive housing 11 having a cylindrical side wall 12, a bottom wall 13 and a shaped top wall 14. Mounted within the housing 10 is a cathode electrode 15 defined by a plurality of substantially parallel plates 16 held in position by a connector plate 17. An insulator 18 is disposed in the space between the electrode 15 and the side wall 12. The battery 10 also comprises an anode electrode 20 having a plurality of parallel plates 21 joined by a connector plate 22. The cathode 15 and the anode 20 are arranged such that the plates 21 interleave with the plates 16; i.e., the plates 16 alternate with the plates 21. Between each pair of plates 16 and 21 is a separator 25 which is composed of a porous material designed to absorb the electrolyte, such as glass woven cloth.

In a lead-acid type storage battery, the anode plates 21 are lead, lead-antimony or lead-calcium. Typically, these plates are pasted with lead oxides. The cathode plates 16 usually have a lead base with an inert material added. The electrolyte impregnated into the substrates 25 is sulfuric acid diluted with water.

Without modification, such construction produces a two volt output. In order to modify that voltage output, the battery 10 contains voltage reducing semiconductor structure in the form of a diode 30 connected between the cathode 15 and the bottom wall 13. A diode 31 is connected in parallel with the diode 30 to provide a path for recharging the battery 10. The anode 20 is connected to an anode terminal 35 attached to but separated from the top wall 14 by an insulator 36. The housing 11 itself constitutes the second or cathode terminal. Thus, there appears between the terminals 13 and 35 a voltage inherently produced by the compositions of the anode 20, the cathode 15 and the electrolyte therebetween, minus the voltage drop across the diode 30. In a lead-acid battery, such inherent voltage would be about two volts and the drop across a silicon diode would be about 0.5 volts, so that the voltage between the terminals 13 and 35 would be 1.5 volts.

In is desirable that the voltage-current characteristic of the diode 30 be as sharp as possible so that the voltage between the terminals stays as constant as possible irrespective of the load.

In recharging the battery, a power supply is connected across the terminals 13 and 35, the positive voltage being applied to the terminal 13. Thus, current flows through the diode 31 and recharges the battery in a known way.

The FIGURE is basically schematically in form in order to depict the general principles involved. For example, mounting structure for the anode 20 and the cathode 15 is not depicted, nor is the mounting for the diodes 30 and 31 shown. These are details that can be accomplished in numerous ways. Furthermore, although particular forms of anode, cathode and electrolyte-containing structure are depicted, numerous other forms are available. For example, the electrodes could be cylindrical or spirally wound rather than planar. Also the diodes 30 and 31 are shown to be connected between the cathode 15 and the negative terminal of the battery. The diodes could instead be connected between the anode 20 and the positive terminal 35, the cathode 15 being connected directly to the housing 11. Alternatively, the plates 16 could be cylindrical with the outermost plate itself defining the side wall of the housing 11. The insulator 36 must have a composition to insure low leakage between the housing 11 and the terminal 35. Although a lead-acid battery has been described, a nickel-alkaline type could also be employed. The electrolyte need not be contained by absorbent separators 25. In stead, the structure could be modified so that the liquid electrolyte itself fills the spaces between the electrodes.

What has been described therefor is a storage battery in which the inherent voltage produced by the chemicals therein is reduced to a usable value, and at the same time providing means to recharge the battery as desired.

I claim:

1. A storage battery comprising a pair of terminals, an anode electrode, a cathode electrode, an electrolyte between and in contact with said electrodes, a pair of oppositely poled semiconductor devices coupled in parallel between one of said electrodes and one of said terminals, the other of said electrodes being coupled to the other of said terminals.

2. The storage battery of claim 1, and further comprising a housing carrying said pair of terminals, said electrodes and said electrolyte being disposed in said housing.

3. The storage battery of claim 1 being of the alkaline type.

4. The storage battery of claim 1, wherein each of said electrodes is basically composed of lead and said electrolyte is sulfuric acid.

5. The storage battery of claim 1, wherein said electrodess are composed respectively of nickel and cadmium and said electrolyte is potassium hydroxide.

6. The storage battery of claim 1, wherein the voltage between said electrodes is about two volts and the voltage between said terminals is about 1.5 volts.

7. A storage battery comprising a pair of termminals, an anode electrode, a cathode electrode, an electrolyte between and in contact with said electrodes, a pair of oppositely poled semiconductor diodes coupled in parallel between one of said electrodes and one of said terminals, the other of said electrodes being coupled to the other of said terminals.

* * * * *